United States Patent
Steffens

(10) Patent No.: US 9,138,053 B2
(45) Date of Patent: Sep. 22, 2015

(54) SNAP CONNECTION ASSEMBLY FOR INTERLOCKING COMPONENTS

(75) Inventor: Robert C. Steffens, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 931 days.

(21) Appl. No.: 13/327,819

(22) Filed: Dec. 16, 2011

(65) Prior Publication Data

US 2013/0153563 A1 Jun. 20, 2013

(51) Int. Cl.
*A47B 77/02* (2006.01)
*A47B 97/00* (2006.01)
*F16B 5/07* (2006.01)

(52) U.S. Cl.
CPC .......... *A47B 77/02* (2013.01); *A47B 97/00* (2013.01); *F16B 5/07* (2013.01); *Y10T 24/4599* (2015.01); *Y10T 24/45241* (2015.01); *Y10T 29/49826* (2015.01)

(58) Field of Classification Search
USPC .............. 126/214 R, 214 B; 312/204, 352; 24/593.1; 219/443.1
See application file for complete search history.

(56) References Cited

U.S. PATENT DOCUMENTS

| 2,762,594 | A | * | 9/1956 | Reeves ..................... 312/352 |
| 3,299,924 | A | | 1/1967 | Hanschitz |
| 4,307,285 | A | * | 12/1981 | DeRemer .................. 219/392 |
| 4,805,592 | A | | 2/1989 | Enami |
| 5,375,921 | A | | 12/1994 | Tupa et al. |
| 6,712,066 | B1 | | 3/2004 | Atkinson et al. |
| 2007/0123113 | A1 | | 5/2007 | Durney |
| 2007/0231062 | A1 | | 10/2007 | Durney |
| 2009/0194089 | A1 | | 8/2009 | Durney |

* cited by examiner

*Primary Examiner* — Avinash Savani

(57) ABSTRACT

A connection assembly snap-interlocking first and second components is initiated with a first tab member provided on a first leg of the first component extending into a slot formed at an inner portion of the second component. The connection is then completed upon relatively rotating the first and second components about an axis defined by the first tab member, with a terminal bent portion of the first tab member engaging with the second component, another portion of the first tab member abutting a biasing arm extending from the second component, and a terminal portion of a second tab member, which extends from an outer edge portion of the second component, being snap-received and retained in an opening formed in a second leg of the first component.

20 Claims, 7 Drawing Sheets

SNAP CONNECTION ASSEMBLY FOR INTERLOCKING COMPONENTS

BACKGROUND OF THE INVENTION

1. Field of the Invention

The present invention pertains to the art of connections and, more particularly, to a connection assembly for snap-connecting two components. The snap connection assembly has particular application in interlocking certain appliance components, such as cosmetic end caps to structural posts for a cooking appliance control panel.

2. Description of the Related Art

Certainly, there exist an abundance of different connection assemblies in the art. In particular, mechanical fasteners are commonly employed to interconnect a wide range of components. Obviously, utilizing mechanical fasteners requires more parts and, although mechanical fasteners can be produced economically, the use of mechanical fasteners can add to the cost of the overall assembly. Perhaps more importantly, the use of mechanical fasteners can add to the complexity and overall assembly time. Although this may not be a significant factor for many products, one can readily image the additional, cumulative assembly time and cost associated with utilizing mechanical fasteners, such as screws, in interconnecting certain components of a product which is mass produced at a manufacturing plant.

With this in mind, some consideration can be given to utilizing other known connection arrangements to avoid, or at least minimize, the need for supplemental mechanical fasteners. Welding, gluing and other similar connection variations are seen to have similar deficiencies in connection with increased elements, cost and assembly time. Still, there are other connections, such as snap or twist-type connections, which can be employed to advantageously avoid the number of parts, as well as reduce assembly time. Unfortunately, these types of connections are generally not very robust and, as such, have not been relied upon to securely interlock multiple components. In addition, snap-type connections are typically relegated for use with interconnecting plastic components which readily provide for necessary component flexure in making the connection.

With the above in mind, it would be beneficial to provide a snap-connection which can be effectively used to interlock components in a robust fashion. More particularly, there is seen to be a need in the art for a snap-type connection particularly for use to securely interlock metal components, or a combination of plastic and metal components.

SUMMARY OF THE INVENTION

The present invention is directed to a connection assembly which enables snap-interlocking of first and second components which can be formed from various materials, particularly metal and plastic. In accordance with the invention, the first component includes first and second angled legs, a first tab member projecting from the first leg and an opening extending into the second leg, and the second component includes at least one leg or body portion provided with an opening adapted to receive the first tab member of the first component and a second tab member including a terminal portion sized to be received in the opening in the second leg of the first component. A biasing arm provided on the second component comes into engagement with the first tab member prior to the second tab member reaching the opening. With this arrangement, the first and second components can be snap-interlocked by initially positioning the first tab member provided on the first leg of the first component into the opening formed in the second component. Thereafter, the components can be relatively rotated, causing the biasing arm to engage the first tab member. Upon further relative rotation, the terminal portion of the second tab member is snap-received into the opening in the first component, while another portion of the second tab member abuts the second leg of the first component. The biasing arm formed in the second component and abutting the tab member of the first component provides a biasing force tending to counter rotate the components relative to each other, thereby stabilizing the interconnected components.

The connection assembly of the invention has a wide range of uses, while finding particular use in attaching cosmetic or trim components to appliances during a manufacturing process in order to substantially reduce or eliminate the need for mechanical fasteners, while significantly reducing the overall assembly time. Still, additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF THE INVENTION

Figure 1:
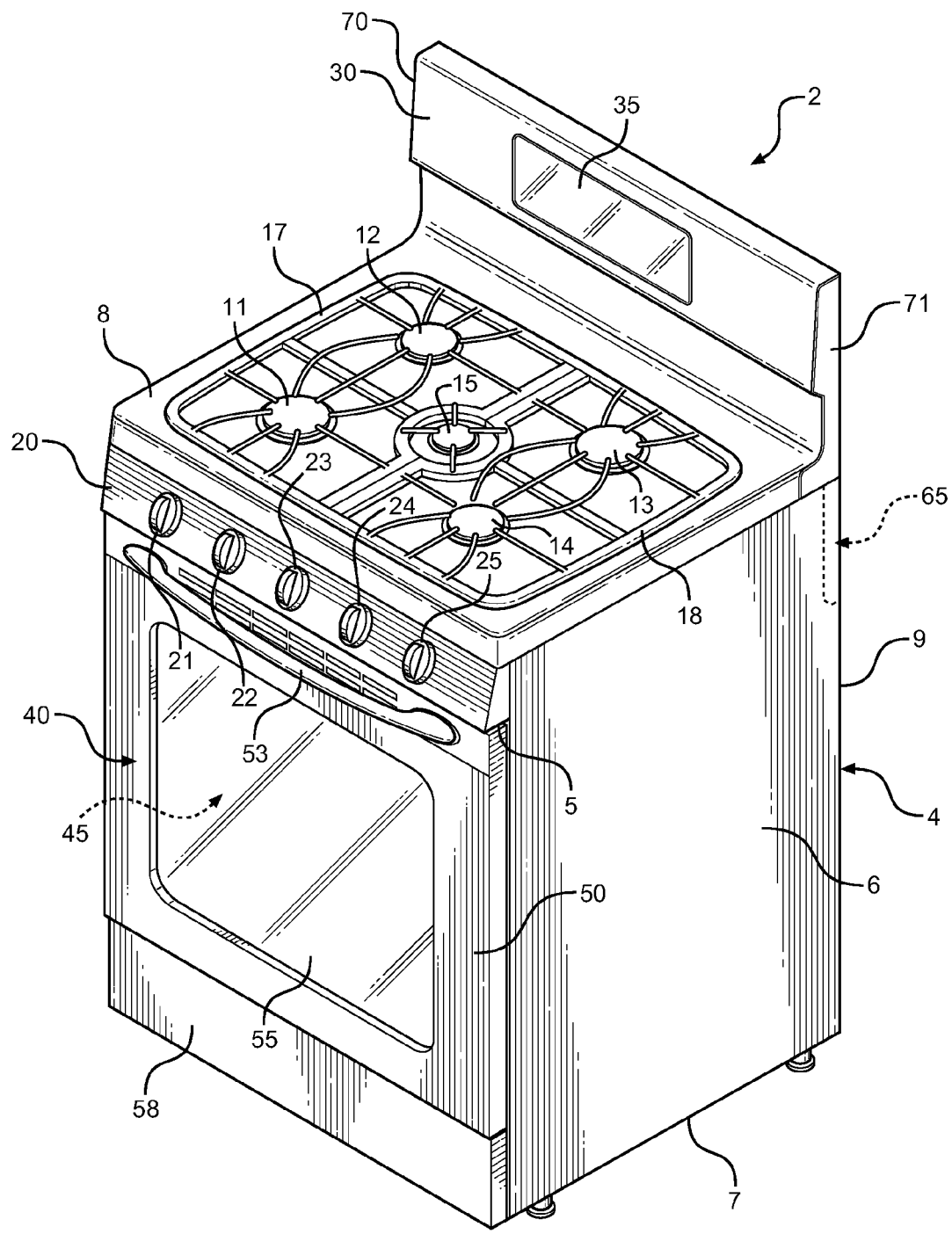
FIG. 1 is an upper right perspective view of a cooking appliance incorporating control panel end-caps connected in accordance with the present invention.

At this early point, it should be pointed out that the connection assembly of the invention can be used to robustly interlock a wide range of components in various fields. However, one particularly advantageous use of the invention is considered to be interlocking cosmetic or trim components to support or structural components in appliances. With this in mind, initial reference will be made to FIG. 1 in fully describing the connection assembly of the present invention utilized to interlock multiple components of a cooking appliance generally indicated at 2. As shown, cooking appliance 2 takes the form of a free-standing gas range. Range 2 includes a cabinet 4 having a front panel portion 5, opposing side panel portions 6, a bottom portion 7, a range top 8, and a main back panel 9. Certainly, range top 8 can take on various forms. In the embodiment shown, range top 8 is provided with five gas burner elements 11-15, i.e., four outer quadrant gas burner elements 11-14 and a central gas burner element 15, which are covered by left and right, mirror image burner grates 17 and 18.

In the embodiment illustrated, cabinet 4 further includes a front control surface 20. Preferably, control surface 20 supports a plurality of control knobs 21-25 for regulating the activation/de-activation of gas burners 11-15 respectively. Furthermore, cabinet 4 includes an upstanding control panel 30 arranged at an upper rear portion 31 of cabinet 4. In the embodiment shown, control panel 30 includes a central control and display unit, generally indicated at 35, for use in establishing a desired heating operation to be performed within an oven 40 of range 2. For this purpose, central control and display unit 35 is employed for conveying information and verifying input/operational parameters to a user. At the same time, oven 40 includes an oven cavity 45 and a door 50 which can be pivoted by means of a handle 53 to access oven cavity 45. As illustrated, door 50 includes a window 55 for viewing the contents of oven cavity 45 when door 50 is closed. Finally, arranged below door 50 and extending across cabinet 4 is a lower face panel 58.

Again, as indicated above, the above structure is known in the art and has been described for the sake of completeness in connection with presenting a preferred embodiment for the connection assembly of the present invention. To this end, it should be noted that cabinet 4 has associated therewith internal rear support structure, such as generally indicated at 65 in connection with the right rear portion of range 2. Similarly, corresponding support structure (not shown) is provided at the left rear portion of range 2. As will become more fully evident below, each support structure 65 is employed in mounting control panel 30. However, particularly important with respect to the present invention is the manner in which each of a pair of metal, cosmetic end caps 70 and 71 provided at rear side regions of cabinet 4 is snap-connected to a respective support structure 65. In particular, it is the cooperating configuration of support structure 65 and end caps 70 and 71 which enables each end cap 70, 71 to be snap-connected to a respective support structure 65 in an extremely secure and robust manner, without a requirement for any additional mechanical fasteners, that is of concern to the present invention as will now be described in detail.

Figure 2:
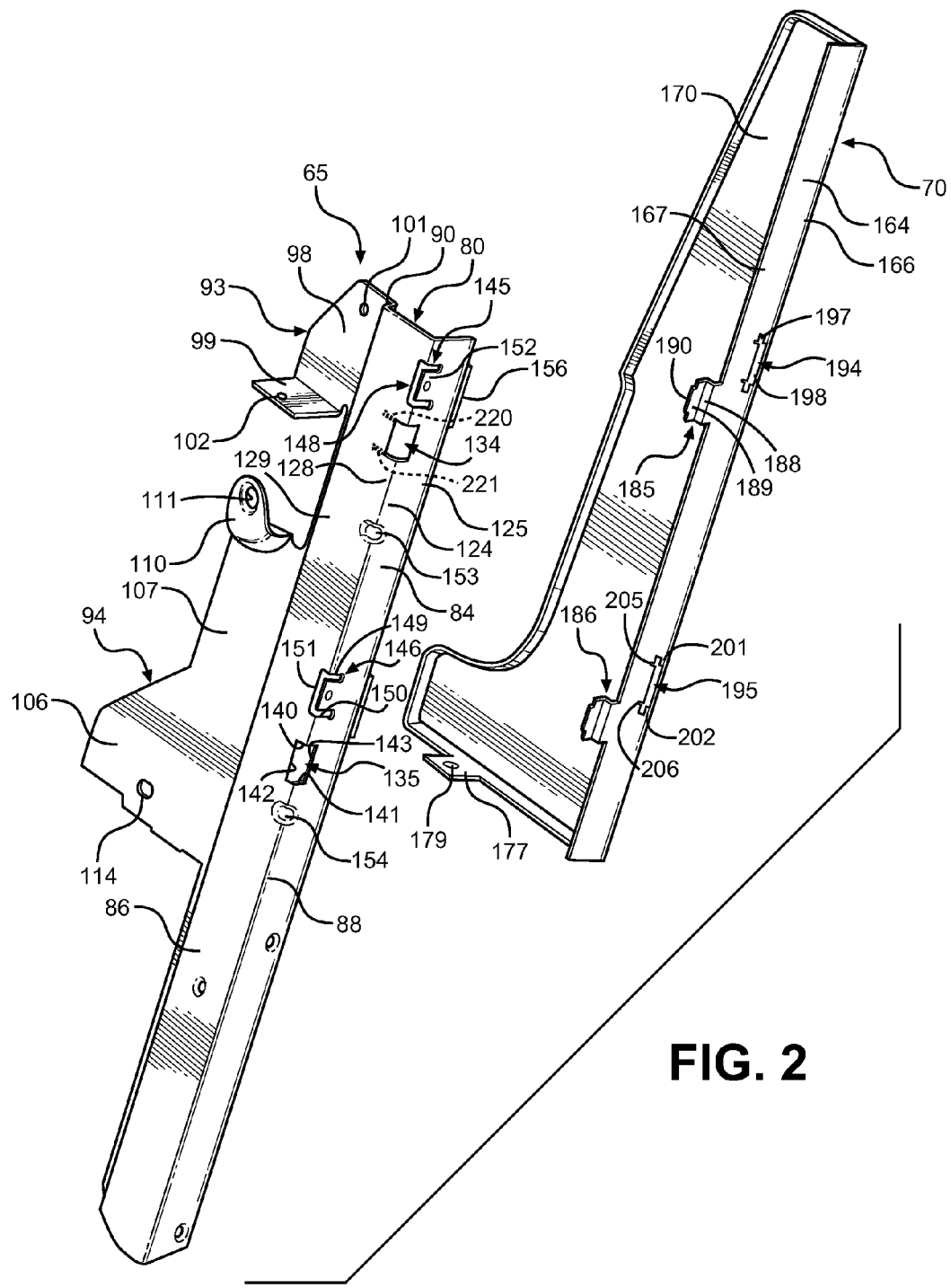
FIG. 2 is an exploded perspective view of an end cap and support post incorporated in the cooking appliance of FIG. 1 and designed to be interlocked in accordance with the connection assembly of the invention.

As shown in FIG. 2, support structure 65 represents a first component to which a second component, represented by end cap 70, is configured to be snap-connected. As depicted, support structure 65 includes a corner post 80 having a first leg 84 and a second leg 86. In the embodiment shown, support structure 65 is formed of sheet metal, with second leg 86 being bent at a substantially perpendicular angle relative to first leg 84 such that a vertex portion 88 is defined there between. Extending from second leg 86, at a position remote from first leg 84, is an offset leg 90 which leads to an upper bracket portion 93 and a lower bracket portion 94. Upper bracket portion 93 is shown to include an uppermost section 98 and a bent flange section 99. A pair of holes 101 and 102 are provided in uppermost section 98 and bent flange section 99 respectively. Lower bracket portion 94 includes a lowermost section 106 leading to an intermediate section 107 having extending therefrom an ear mount 110 provided with a hole 111. Also provided in lowermost section 106 is a hole 114. In connection with the overall invention, the particular configuration and construction of upper and lower bracket portions 93 and 94 are not significant to the invention. Instead, it is simply important to note at this point that a particularly preferred embodiment of the connection assembly is for use in the mounting of control panel 30. Therefore, the particular construction of upper and lower bracket portions 93 and 94 are configured based on the structure of range top 8 and control panel 30 which extend between and are mounted to the corresponding side corner posts 80 through respective regions of bracket portions 93 and 94.

More importantly, as the connection assembly of the present invention can be utilized in a wide range of fields, it is the construction and arrangement of first and second legs 84 and 86 which is of more interest to the invention. As shown, first leg 84 includes a first inner portion 124 leading to a first outer portion 125. In a similar manner, second leg 86 includes a second inner portion 128 leading to a second outer portion 129. It is from second outer portion 129 that upper and lower bracket portions 93 and 94 extend, with all the structure being shown to be formed from bending a single piece of sheet metal. As depicted, first and second legs 84 and 86 are provided with a pair of spaced openings 134 and 135. As each opening 134, 135 is identically constructed, a detailed description will be made regarding opening 134 and it is to be understood that opening 135 has corresponding structure. As illustrated, opening 134 preferably extends through vertex portion 88 and is defined by upper, lower and side edges 140-143. In this manner, opening 134 extends partially into first leg 84, as well as partially into second leg 86. However, as will become more fully evident below, it is the extension of opening 134 into second leg 86 which is particularly important in accordance with the invention.

Also shown spaced from openings 134 and 135 are a pair of distortion reducing reliefs 145 and 146. Although reliefs 145 and 146 can take various forms, each is shown to take the form of a U-shaped slot 148 having spaced slot portions 149 and 150 joined by a cross slot section 151. An arm 152, which stems from part of first leg 84, aids in defining U-shaped slot 148 and includes an aperture (not separately labeled) which is adapted to receive a screw (not shown) used to attach back panel 9 to corner post 80. For the sake of completeness, corner post 80 is also shown to include spaced dimpled zones 153 and 154 which add rigidity to the angle between first and second legs 84 and 86. More important in connection with the present invention is the inclusion of first and second tab members 156 and 157 projecting from first outer portion 125. Although tab members 156 and 157 can be vertically aligned with or vertically spaced from openings 134 and 135, the tab members 156 and 157 are certainly horizontally or laterally spaced from openings 134 and 135 based on the orientation as illustrated in this figure.

As indicated above, the connection assembly of the present invention is being described with reference to the exemplary arrangement of mounting end caps 70 and 71 to cabinet 4 of range 2. FIG. 2 also shows end cap 70 which essentially constitutes a cover member for the terminal ends of control panel 30. In this sense, end cap 70 represents a cosmetic or trim piece for range 2. In any case, end cap 70 is shown to include a first body portion 164 that represents a rear side of end cap 70. First body portion 164 is established by an inner portion 166 and an outer portion 167. End cap 70 also includes a second body portion or face 170, as well as an in-turned peripheral edge 174. In the exemplary embodiment shown, in-turned peripheral edge 174 is provided with a tab 177 having an opening 179 at a bottom thereof.

Projecting from outer portion 167 of first body portion 164 is a pair of spaced second tab members 185 and 186. As with openings 134 and 135, each of second tab members 185 and 186 are identically constructed such that the construction of second tab member 185 will now be described in detail and it is to be understood that second tab member 186 has identical structure. As shown, second tab member 185 includes a first tab portion 188 extending directly from outer portion 167 of first body portion 164, a second tab portion 189 extending at an angle from the first tab portion 188, and a terminal tab portion 190 projecting from the second tab portion 189. In the most preferred embodiment shown, first tab portion 188 projects at an acute angle relative to first body portion 164 and away from second body portion 170. Second tab portion 189 is angled relative to first tab portion 188 so as to extend substantially parallel to first body portion 164. Terminal tab portion 190 essentially constitutes a reduced length section of second tab portion 189 so as to also extend substantially parallel to first body portion 164. As will be more fully evident below, each second tab member 185, 186 is adapted to cooperate with a respective opening 134, 135 such that second tab members 185 and 186 are spaced along first body portion 164 a distance corresponding to the spacing between openings 134 and 135 along corner post 80. In essence, these tab and opening combinations constitute portions of a respective connection assembly such that the spaced pairs represent parts of two connection assemblies constructed in accordance with the present invention.

As also shown in FIG. 2, provided along first body portion 164 within inner portion 166 is a pair of spaced openings 194 and 195. Again, openings 194 and 195 are commensurately constructed such that a detail reference will now be made to the preferred configuration of opening 194 and it is to be understood that opening 195 is correspondingly formed. As shown, opening 194 includes a first longitudinally extending slot portion 197 and a second longitudinally extending slot portion 198. Second longitudinally extending slot portion 198 opens into first longitudinally extending slot portion 197 but is shorter than first longitudinally extending slot portion 197 such that a pair of spaced lands 201 and 202 are established at inner portion 166 of first body portion 164. In the most preferred embodiment shown, first longitudinally extending slot portion 197 is also provided with a pair of spaced cut-out extensions 205 and 206 between which extends a biasing arm 208, which can be linear or arcuate in shape. Although not shown in FIG. 2 based on the perspective taken, arm 208 of this embodiment actually curves into end cap 70 and includes a terminal end portion (not shown) which extends substantially parallel to second body portion 170.

Figure 3A:
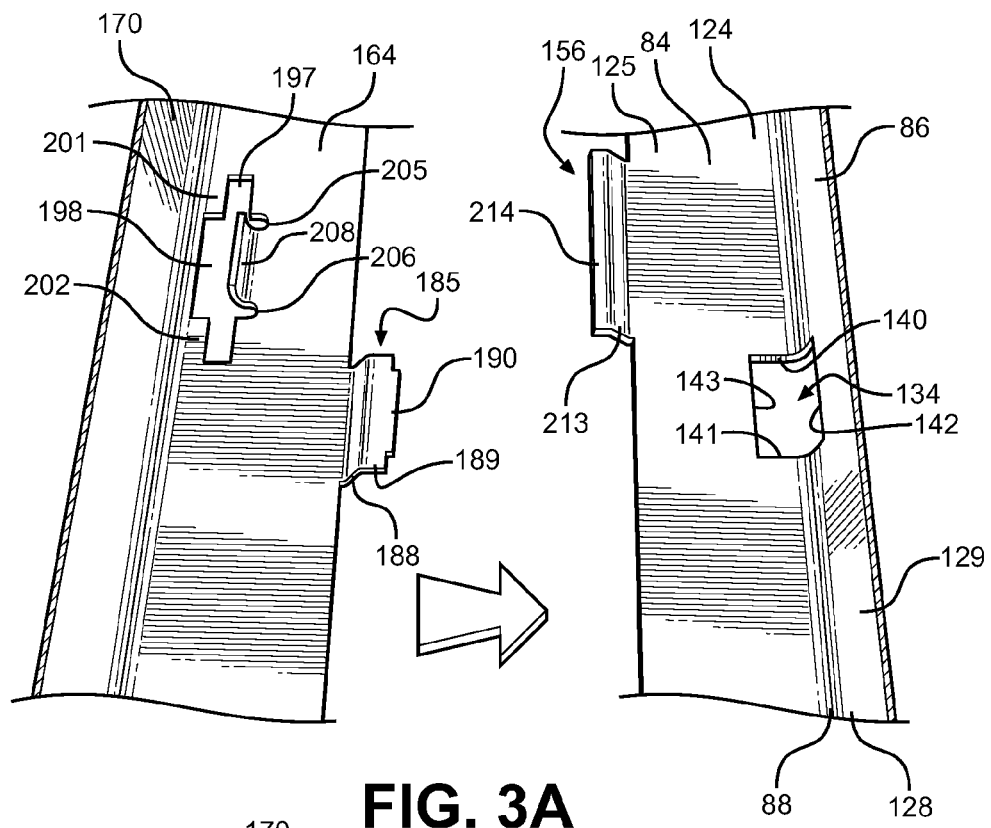
FIG. 3A is an enlarged exploded view of portions of first and second metal components designed to be connected in accordance with the present invention.
Figure 3B:
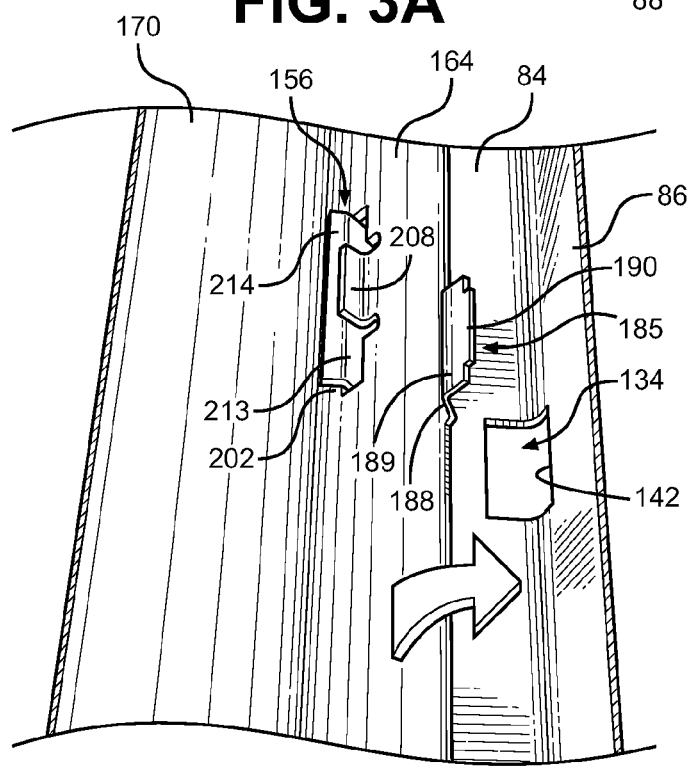
FIG. 3B shows the enlarged component portions of FIG. 3A in a partially assembled state.
Figure 3C:
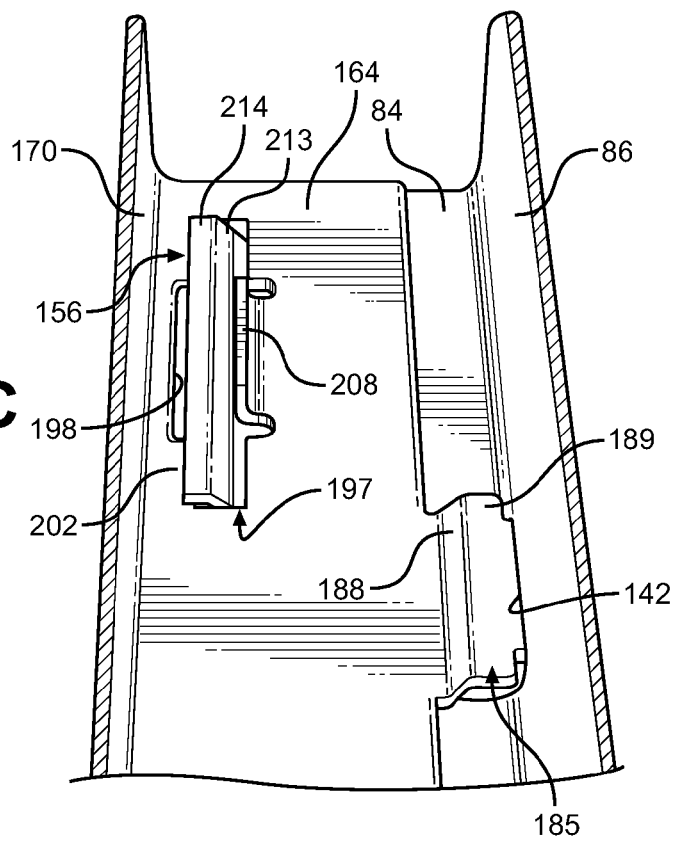
FIG. 3C shows the enlarged component portions of FIG. 3A in a fully assembled state.
Figure 3D:
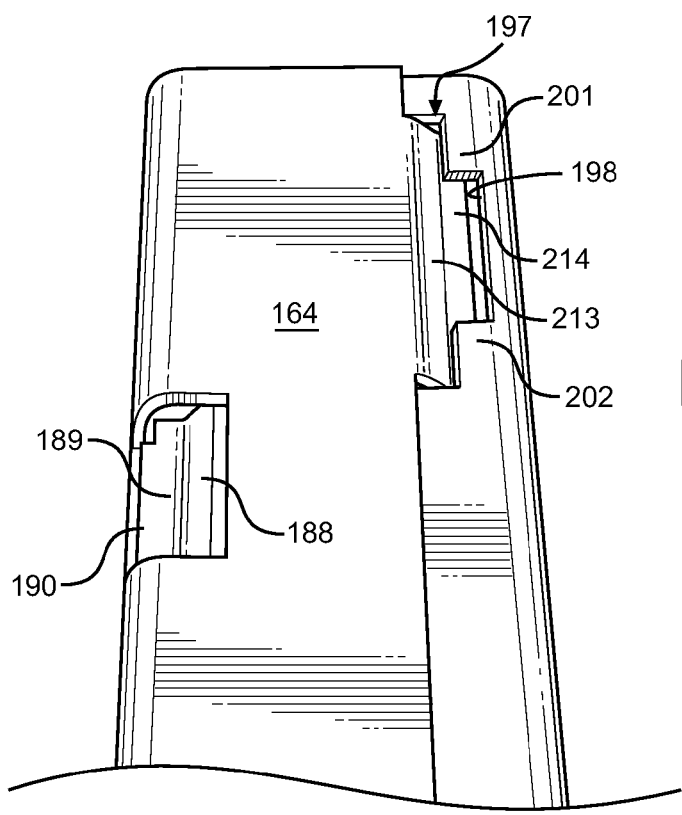
FIG. 3D shows an opposing side view of the fully assembled arrangement of FIG. 3C.

Reference will now be made to FIGS. 3A-3D in describing the manner in which two components, here end cap 70 and corner post 80, are interlocked in accordance with the present invention. Initially, first and second legs 84 and 86 are arranged spaced from first body portion 164 and second body portion 170 as shown in FIG. 3A. Upon initial interconnection, first body portion 164 is angled and arranged spaced from first leg 84 such that first tab member 156 can be inserted within first longitudinally extending slot portion 197 of opening 194. To this end, it should be noted that each first tab member includes a first tab portion 213 and a second tab portion 214. First tab portion 213 projects at an angle from first leg 84 and away from second leg 86. First tab portion 213 leads to second tab portion 214, which is angled relative to first tab portion 213 and preferably extends substantially parallel to first leg 84 in a different, offset plane. As illustrated, first tab portion 213 preferably extends at an obtuse angle from first leg 84, while second terminal tab portion 214 extends at an acute angle from first tab portion 213. With this arrangement, first tab portion 213 projects through opening 197 and, as first body portion is rotated in a manner indicated in FIG. 3B, second tab portion 214 abuts lands 201 and 202. At the same time, terminal tab portion 190 of second tab member 185 reaches opening 134. At this point, first body portion 164 is slightly spaced from first leg 84 and first tab portion 213 abuts biasing arm 208. However, continued rotation of first body portion 164 causes flexure of both first tab member 156 and second leg 86, thereby allowing terminal tab portion 190 to snap into opening 134 as illustrated in FIG. 3C. To further enhance the flexure of second leg 86, flex-enhancing reliefs, such as that indicated in the form of slots or slits 220 and 221 in FIG. 2 for opening 134, could also be provided. Once terminal tab portion 190 is snapped into position, first body portion 164 is securely fixed to corner post 80. This overall interconnection is further illustrated in FIG. 3D which shows an opposing side view of the fully assembled arrangement of FIG. 3C.

Figure 4A:
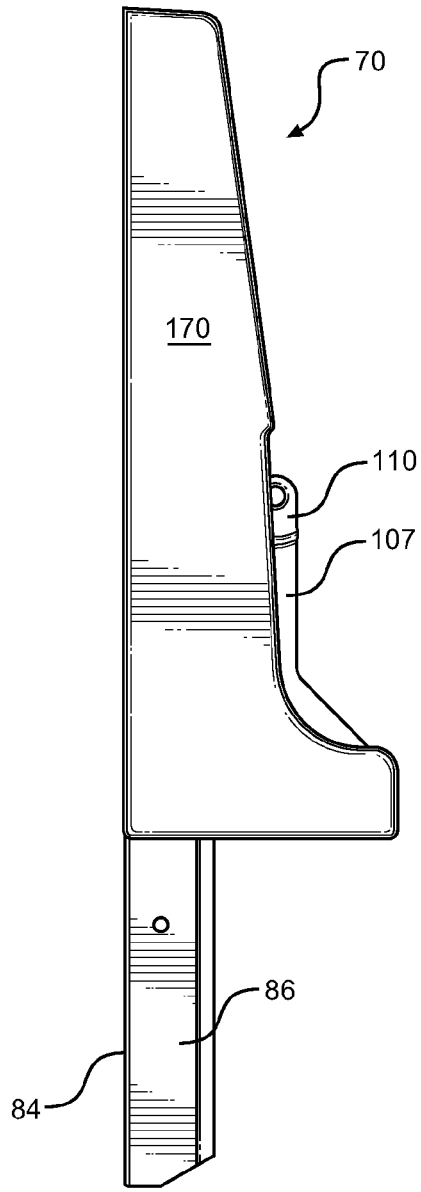
FIG. 4A shows an outer side view of the end cap and support post fully assembled in accordance with the invention.
Figure 4B:
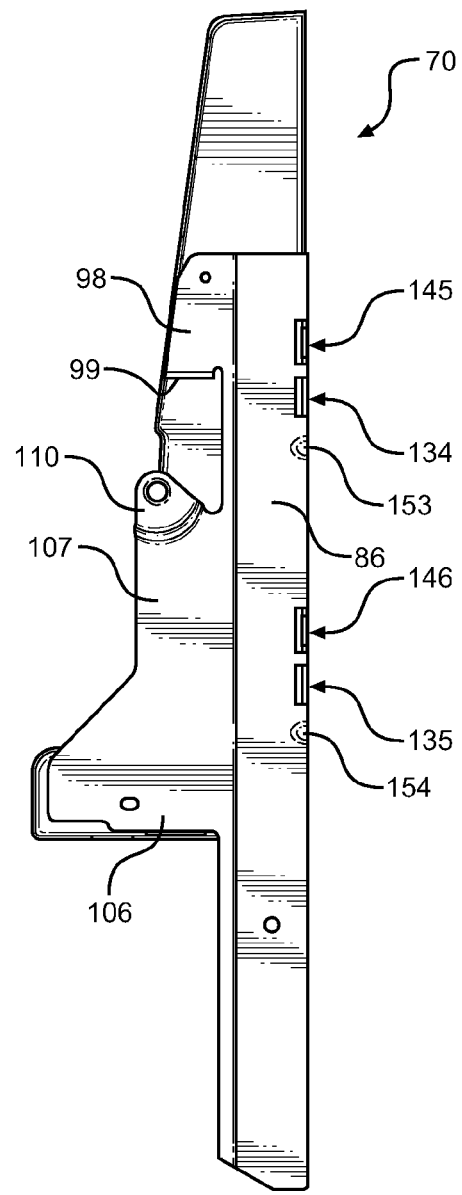
FIG. 4B shows an inner side view of the fully assembled end cap and support post of FIG. 4A.

As previously indicated, the snap connection assembly of the present invention can be utilized to interlock a wide range of components. In particular, it is essentially required that the first component have relatively angled legs and be formed with a tab member corresponding to first tab member 156 and an associated opening 134, while the second component include at least a corresponding first body portion having a tab member corresponding to the second tab member 185 and an opening corresponding to opening 194. Although the connection assembly can be utilized in a wide range of fields, it is considered particularly advantageous in connection with securing trim or cosmetic pieces onto appliances during the manufacture thereof. Along these lines, the connection assembly has particular applicability to securing end caps 70 and 71 to corner posts 80 of range 2. Although various other connection arrangements can be utilized, employing the present invention enables end caps 70 and 71 to be easily, fixedly snap-secured in place with a minimal number of connection assemblies and without worry of the need for cost and assembly time associated with additional mechanical fasteners. As illustrated in connection with FIG. 2, two identically constructed connection assemblies are provided along the length of one side of end cap 70 to establish the desired connection. To further support a free end (not separately labeled) of each end cap 70, 71, opening 179 of tab 177 can cooperate with additional structure (not shown) provided for cabinet 4 to finalize the overall assembly, such as through another snap connection, a friction fit or a mechanical fastener extending through opening 179. At this point, it should be realized that additional fastening structure could also be provided, such as a similar tab at an upper end of the end cap 70, 71 to directly fasten the end cap 70, 71 to control panel 30. However, given the robustness of the snap connection assembly of the invention, this additional fastening arrangement is actually not needed for the end cap 70, 71, but could be beneficial to further support control panel 30. In any case, it should be readily apparent that end caps 70 and 71 can be quickly snap-fit to the respective corner posts 80 in a minimal amount of time along an assembly line by utilizing the connection assembly of the present invention. FIGS. 4A and 4B represents side views illustrating the fully attached arrangement of end cap 70 to corner post 80. This actual assembly of end cap 70 to corner post 80 can be performed either before or after control panel 30 is secured across range 2 through the use of mechanical fasteners provided in connection with upper and lower bracket portions 93 and 94. Certainly, although two connection assembly points are referenced for use in securing end caps 70 and 71 to each corner post 80, the overall number of connection assemblies would be correspondingly varied depending upon the length of the parts employed. Therefore, for interconnecting first and second components which are quite small, only a single connection assembly as illustrated in FIGS. 3A-3D would be necessary. Depending upon the robustness of the connection desired and the overall length of the components, additional spaced connection assemblies, such as the two spaced connection assemblies indicated in FIGS. 2, 4A and 4B, could be employed.

Figure 5A:
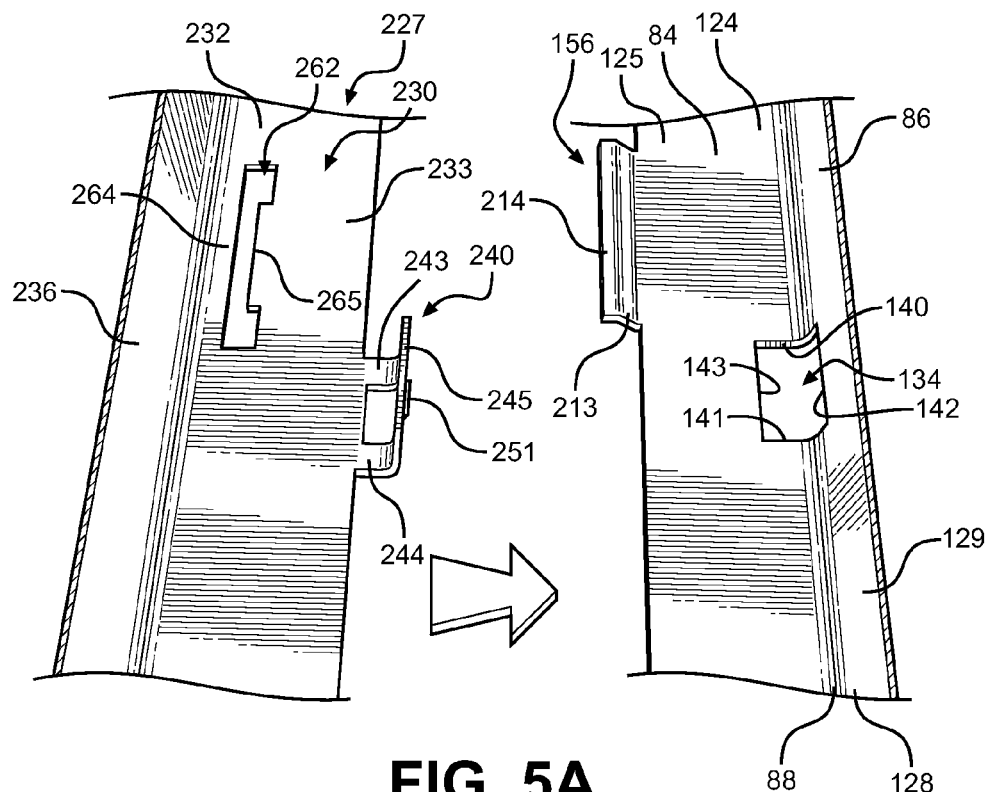
FIG. 5A is an enlarged exploded view of portions of metal and plastic components designed to be connected in accordance with the present invention.

In addition to the above, it should be understood that the connection assembly of the present invention need not be limited for use between metal components. Instead, each of the first and second components could be formed of plastic and assembled in a manner similar to that shown in FIGS. 3A-3D. However, since the robustness of the overall interconnection relies to some extent on the stiffness of the overall components, a different design is preferable when utilizing plastic in forming one or more of the components. To this end, reference will now be made to FIGS. 5A-5D which illustrates the connection assembly of the present invention used to snap-interlock a plastic second component 227 to the first component referenced with respect to corner post 80. Therefore, the first component in this embodiment is made of metal, while second component 227 is preferably made of plastic. As clearly shown with initial reference to FIG. 5A, second component 227 includes a first body portion 230 having an inner portion 232 and an outer portion 233. In addition, second component 227 includes a second body portion or a face 236 which extends at an angle from first body portion 230 in a manner directly corresponding to the arrangement between first leg 84 and second leg 86 described above. However, unlike the first embodiment described above, first body portion 230 of second component 227 is provided with a second tab member 240 having first and second tab sections 243 and 244 which are interconnected by a connecting tab section 245. Stemming from connecting tab section 245 is a flexible arm 248 that is formed with a terminal catch 251. Catch 251 has a tapered or beveled end portion 254, as well as a ledge 258 spaced from tapered end portion 254. Also provided in first body portion 230 is an opening 262 that takes the form of a longitudinally extending slot 262 which defines an upper land 264. Projecting into opening 262 from a side opposite land 264 is a biasing arm 265.

Figure 5B:
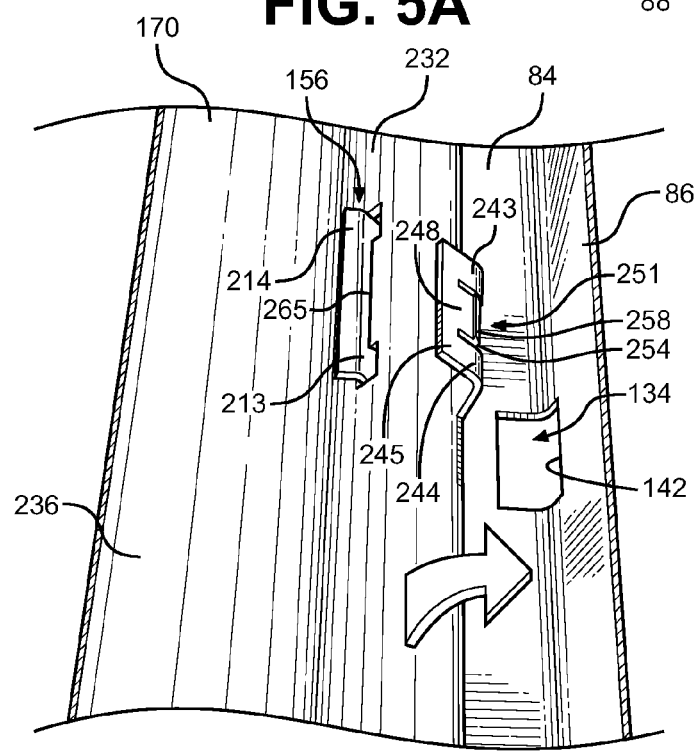
FIG. 5B shows the enlarged component portions of FIG. 5A in a partially assembled state.
Figure 5C:
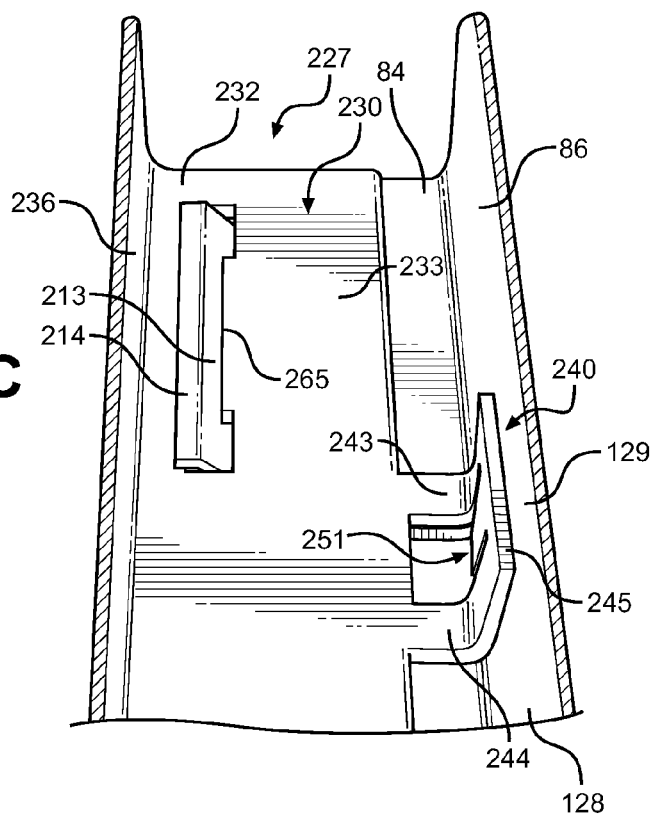
FIG. 5C shows the enlarged component portions of FIG. 5A in a fully assembled state.
Figure 5D:
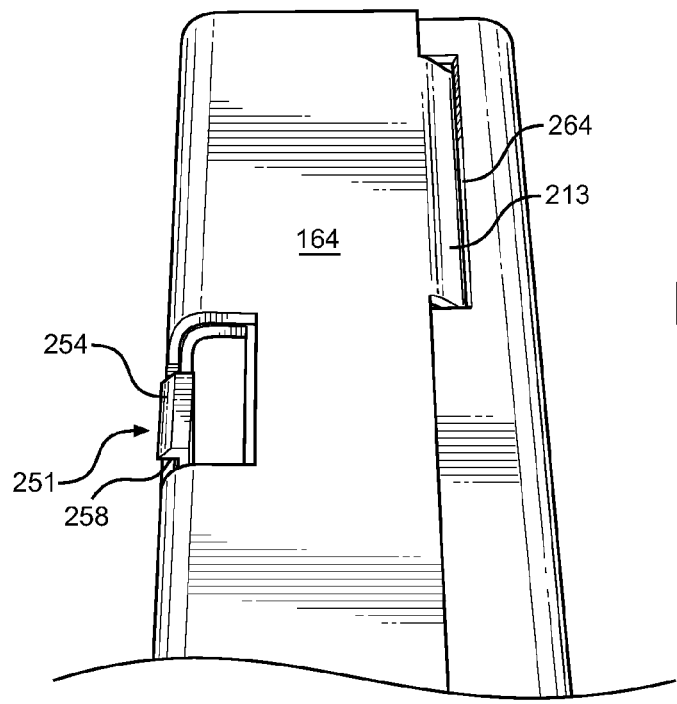
FIG. 5D shows an opposing side view of the fully assembled arrangement of FIG. 5C.

As shown in FIG. 5B, initial assembly includes the insertion of first tab member 156 into opening 262 such that terminal tab portion 158 extends over land 264. Continued rotation of first body portion 230 causes arm 265 to abut against first tab portion 157 prior to catch 251 reaching opening 134. At this point, forced rotation of second component 227 causes flexure of the components as tapered end portion 254 rides against second leg 86 and catch 251 projects into opening 134 such that ledge 258 comes into engagement with side edge 142. At this point, due to the interaction between arm 165 and first tab member 157, as well as the interengagement of terminal tab portion 158 with land 264, flexible arm 248 is biased in a direction away from first leg 84, thereby maintaining a robust interlocking arrangement between catch 251 and second leg 86 at opening 134.

As with the embodiment described above, the embodiment of FIGS. 5A-5D can be utilized in relation to securing a wide range of components. Certainly, it should be readily apparent that in each of these embodiments, the second body portion or face 170, 236 can take various forms without altering the overall connection assembly. That is, there are no tabs or cut-outs provided in either second body portions but instead each portion provides a smooth, aesthetically pleasing surface which is particularly advantageous in connection with the preferred embodiment wherein the invention is utilized for securing trim or cosmetic pieces. In any case, although the embodiments described above utilize second components which only include body portions that are angled at substantially 90° from one another, it should be readily apparent that the second body portion 170, 236 can extend from the first body portion 164, 230 in a wide range of fashions without negatively affecting the interlocking arrangement of the connection assembly. With this in mind, although described with respect to preferred embodiments of the invention, it should be readily understood that various changes and/or modifications can be made to the invention without departing from the spirit thereof. Again, it should be realized that the connection assembly of the invention can be utilized with a wide range of components made from varying materials and used in numerous fields. In general, the invention is only intended to be limited by the scope of the following claims.

What is claimed is:

1. An appliance including a connection assembly comprising:
    a cabinet including at least a front panel, opposing side panels and a support member, said cabinet being adapted to rest upon a substantially horizontal supporting surface, said support member establishing a first component including: a first leg having a first inner portion and a first outer portion; a second leg having a second inner portion extending at an angle from the first inner portion to establish a vertex portion of the first component, and a second outer portion; a first tab member projecting from the first inner portion of the first leg; and an opening extending into the second inner portion of the second leg; and
    a cover member establishing a second component including: a first body portion having an inner portion and an outer portion; a second tab member projecting from the outer portion of the first body portion; and an opening formed in the inner portion of the first body portion, wherein the cover member is snap-connected to the support member, with the first tab member extending into the opening formed in the inner portion of the first body portion, the first body portion extending along the first leg and the second tab member being snap-received and retained in the opening of the second leg.

2. The appliance according to claim 1, wherein the opening of the first component extends from the vertex portion into each of the first and second legs.

3. The appliance according to claim 2, wherein the opening in the second component constitutes a slot.

4. The appliance according to claim 1, wherein the second tab member is in direct contact with the second leg of the support member.

5. The appliance according to claim 1, wherein the opening in the second component includes a first, longitudinally extending slot portion and the first body portion includes a biasing arm extending along one side of the first slot portion and at least one land extending along an opposing side of the first slot portion, said first tab member extending through the first slot portion, abutting the at least one land and engaging the biasing arm.

6. The appliance according to claim 5, wherein the first tab member includes a first tab portion leading to a terminal tab portion, with the terminal tab portion being angled relative to the first tab portion and abutting the at least one land, while the terminal tab portion engages the biasing arm.

7. The appliance according to claim 1, wherein the second tab member includes a first tab portion extending directly from the outer portion of the first body portion, a second tab portion extending at an angle from the first tab portion and a terminal tab portion projecting from the second tab portion, said terminal tab portion having a reduced length as compared to the second tab portion, wherein only the terminal tab portion extends into the opening of the second leg.

8. The appliance according to claim 7, wherein the second tab member is formed of plastic and the terminal tab portion includes a catch having a tapered portion leading to a ledge which is snap-received and retained in the opening of the second leg.

9. The appliance according to claim 1, wherein the appliance constitutes a cooking appliance and the cover member constitutes a cosmetic component of the cooking appliance.

10. The appliance according to claim 9, wherein the cooking appliance constitutes a freestanding range including:
   a range top supported upon the cabinet;
   a plurality of heating elements arranged about the range;
   an oven; and
   a control panel extending across a rear portion of the cabinet, said second component constituting an end cap for the control panel.

11. The appliance according to claim 10, wherein the control panel is directly connected to the cabinet through the first component.

12. A connection assembly comprising:
   a first component including: a first leg having a first inner portion and a first outer portion; a second leg having a second inner portion extending at an angle from the first inner portion to establish a vertex portion of the first component, and a second outer portion; a first tab member projecting from the first inner portion of the first leg; and an opening into the second inner portion of the second leg; and
   a second component including: a first body portion having an inner portion and an outer portion; a second tab member projecting from the outer portion of the first body portion; and an opening formed in the inner portion of the first body portion, wherein the second component is snap-connected to the first component, with the first tab member extending into the opening formed in the inner portion of the first body portion, the first body portion extending along the first leg and the second tab member being snap-received and retained in the opening of the second leg.

13. The connection assembly according to claim 12, wherein the opening of the first component extends from the vertex portion into each of the first and second legs.

14. The connection assembly according to claim 13, wherein the opening in second component constitutes a slot.

15. The connection assembly according to claim 12, wherein the second tab member is in direct contact with the second leg of the first component.

16. The connection assembly according to claim 12, wherein the opening in the second component includes a first, longitudinally extending slot portion and the first body portion includes a biasing arm extending along one side of the first slot portion and at least one land extending along an opposing side of the first slot portion, said first tab member extending through the first slot portion, abutting the at least one land and engaging the biasing arm.

17. The connection assembly according to claim 16, wherein the first tab member includes a first tab portion leading to a terminal tab portion, with the terminal tab portion being angled relative to the first tab portion and abutting the at least one land, while the terminal tab portion engages the biasing arm.

18. The connection assembly according to claim 12, wherein the second tab member includes a first tab portion extending directly from the outer portion of the first body portion, a second tab portion extending at an angle from the first tab portion and a terminal tab portion projecting from the second tab portion, said terminal tab portion having a reduced length as compared to the second tab portion, wherein only the terminal tab portion extends into the opening of the second leg.

19. The connection assembly according to claim 18, wherein the second tab member is formed of plastic and the terminal tab portion includes a catch having a tapered portion leading to a ledge which is snap-received and retained in the opening of the second leg.

20. A method of interlocking first and second components comprising:
   inserting a first tab member provided on a first leg of the first component into a slot formed at an inner portion of the second component;
   relatively rotating the first and second components to cause a portion of the first tab member to engage at least one land of the second component and another portion of the first tab member to abut a biasing arm extending from the second component; and
   continuing to relatively rotate the first and second components until a terminal portion of a second tab member extending from the second component is snap-received and retained in an opening formed in a second leg of the first component.

* * * * *